United States Patent [19]
Goldstein

[11] Patent Number: 5,812,132
[45] Date of Patent: *Sep. 22, 1998

[54] WINDOWED COMPUTER DISPLAY

[75] Inventor: David S. Goldstein, Plano, Tex.

[73] Assignee: Prosoft Corporation, Dallas, Tex.

[*] Notice: The term of this patent shall not extend beyond the expiration date of Pat. No. 5,555,364.

[21] Appl. No.: 708,798

[22] Filed: Sep. 9, 1996

Related U.S. Application Data

[63] Continuation of Ser. No. 294,502, Aug. 23, 1994, Pat. No. 5,555,364.

[51] Int. Cl.$^6$ ............................................. F06F 3/00
[52] U.S. Cl. .................................. 345/345; 345/344
[58] Field of Search ................................ 395/340, 343, 395/344, 345

[56] References Cited

U.S. PATENT DOCUMENTS

| | | | |
|---|---|---|---|
| 5,252,951 | 10/1993 | Tannenbaum et al. | 345/156 |
| 5,377,317 | 12/1994 | Bates et al. | 395/157 |
| 5,390,295 | 2/1995 | Bates et al. | 395/157 |
| 5,408,603 | 4/1995 | Van de Lavoir et al. | 395/161 |
| 5,530,865 | 6/1996 | Owens et al. | 395/343 X |

FOREIGN PATENT DOCUMENTS

| | | | |
|---|---|---|---|
| 0 349 458 A2 | 1/1990 | European Pat. Off. | G06F 9/46 |
| 0 349 459 A2 | 1/1990 | European Pat. Off. | G06F 9/46 |

OTHER PUBLICATIONS

IBM Publication entitled "Using the Operating System," May 1993.
Publication by Microsoft Press entitled "Programming Windows," by Charles Petzold, Copyright 1988.

*Primary Examiner*—Raymond J. Bayerl
*Assistant Examiner*—A. Katbab
*Attorney, Agent, or Firm*—Hitt Chwang & Gaines, P.C.

[57] ABSTRACT

A method of displaying graphical data on a display device of a computer system and a computer system employing the method. The method comprises the steps of: (1) forming a first window on the display device, the first window capable of displaying data associated with a first task executing on the computer system, the first window occluding a first portion of a total area of the display device, the first window being a currently active window and (2) forming a second window on the display device, the second window capable of displaying data associated with a second task executing on the computer system, the second window occluding a second portion of the total area of the display device and superseding the first window as the currently active window, the first window occluding the second window to an extent that the first portion overlaps the second portion, the first window continuing to present functions associated with the first task to the user while the user interacts with the second task, the first task automatically redesignating the second window as the currently active window when the user is not interacting with the first task.

27 Claims, 10 Drawing Sheets

The foregoing has outlined rather broadly the features and technical advantages of the present invention so that the detailed description of the invention that follows may be better understood. Additional features and advantages of the invention will be described hereinafter which form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention set forth in the appended claims.

*FIG. 7*

WINDOWED COMPUTER DISPLAY

This application is a continuation, of application Ser. No. 08/294,502, filed on Aug. 23, 1994, U.S. Pat. No. 5,555,364.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright protection whatsoever.

TECHNICAL FIELD OF THE INVENTION

The present invention is directed, in general, to a graphical display for a general purpose computer system and, more specifically, to displaying multiple windows, each associated with a different task, on a single display.

BACKGROUND OF THE INVENTION

Early computer systems, including personal computers ("PCs"), employed a character-based display interface wherein a standard set of characters was defined in firmware or hardware for the computer system. To display one of the set of characters, a code corresponding to the character to be displayed was transmitted from the computer system's central processing unit ("CPU") to, most typically, video random access memory ("VRAM") upon which the display was mapped. Character-based displays were relatively efficient in terms of CPU bandwidth required, but were also inflexible in that the character set limited their display capabilities.

In response to this inflexibility and in an attempt to define a new paradigm for displaying information on a computer display, Xerox® developed a graphical user interface ("GUI") environment employing software-configurable bit-mapped graphical images rather than a firmware or hardware-defined set of characters to display information. The GUI environment also typically employs a mouse or other pointing device to allow a user to point, click or click and drag icons or other symbols about the display to signify operations to be undertaken by the computer system. This is in lieu of previous character-based command-driven interfaces.

Of perhaps even more moment, the GUI environment introduced the concept of "windows" wherein the computer system can display data corresponding to several application tasks at once. The data pertaining to each application task is contained in an associated movable, sizable window covering a region that is all or only a portion of the entire area of the display. Windows can overlap and occlude one another, much the way papers overlap and occlude one another on a desktop.

Conventionally, one window (an "active window") overlaps all others ("inactive windows"). The active window contains data pertaining to an application task executing in the foreground. By clicking on an inactive window, a user can cause the inactive window to come to the fore visually and can cause execution of the corresponding application task to move to the foreground.

Other computer manufacturers have adopted the GUI environment paradigm in operating systems for PCs. Apple® developed a GUI operating system for the Lisa® and the Macintosh®. Microsoft® developed Windows® for IBM-compatible PCs. IBM® itself developed OS/2®, also for IBM-compatible PCs. These new GUI operating systems have proven to be powerful and popular, particularly among computer users who are unfamiliar or uncomfortable with more traditional command-driven interfaces.

As stated above, the active window overlaps inactive windows. A user has complete access to functions of the application task corresponding to the active window. To access functions of an application task contained in any one of the inactive windows, the user is forced to make the desired application task's inactive window active before accessing any of the functions therein. Once having accessed those functions, the user must then reactivate the previous active window to return to the original application task.

For example, if a user is working in a word processor application task, the word processor is displayed in an active window. If the user wants to access a separate database manager application task, the user must activate the database manager application task, thereby moving the word processor application task to the background. To return to the word processor application task, the user must manually activate the then inactive window corresponding to the word processor application task by clicking in the word processor application task's window. The user must therefore undergo several operation to access functions of a few different tasks.

The above disadvantage is particularly acute for users who bill their professional time to clients. Timekeeping application tasks that allow a user to measure and record time spent on a given project have become popular among such users. However, with existing timekeeping application tasks, the user must activate a window corresponding to the timekeeping application task to establish, start or stop timers. This interrupts the previous application task with which the user was interacting. The user must manually reactivate the previous application task to return to the point at which the user was prior to activating the timekeeping application task. When the user reactivates the previous application task, the window corresponding thereto moves to the fore, perhaps occluding the window corresponding to the timekeeping application task and obscuring the timekeeping application task's timer displays.

Accordingly, what is needed in the art is an application task wherein functions of the application task can be accessed without inactivating the currently active window and wherein execution automatically returns to the currently active window once one of the functions of the application task has been accessed, thereby allowing a user continued access to the currently active window.

SUMMARY OF THE INVENTION

To overcome the above-detailed disadvantages and shortcomings of the prior art, it is a primary object of the present invention to provide, in a GUI environment, a means by which a user can continue to access functions of a first task when a second task is in the foreground without requiring the user to remove the second task from the foreground, execution automatically returning to the second task when a function of the first task has been accessed.

In the attainment of the above-described primary object, the present invention provides a method of displaying graphical data on a display device of a computer system and a computer system employing the method. The method comprises the steps of: (1) forming a first window on the display device, the first window capable of displaying data associated with a first task executing on the computer system, the first window occluding a first portion of a total area of the display device, the first window being a currently active window and (2) forming a second window on the display device, the second window capable of displaying data associated with a second task executing on the computer system, the second window occluding a second portion of the total area of the display device and superseding the first window as the currently active window, the first window occluding the second window to an extent that the first portion overlaps the second portion, the first window continuing to present functions associated with the first task to the user while the user interacts with the second task, the first task automatically redesignating the second window as the currently active window when the user is not interacting with the first task.

A primary advantage of the present invention is that one can access a background task without moving it to the foreground and that, once access of the background task is completed, the foreground task automatically reactivates. This is in stark contrast to the prior art, wherein the user must manually reactivate the second task by clicking in the second window. The background task remains accessible to the user because it continually presents a window to the user (occluding all other windows as necessary, including the window containing the foreground task).

In a preferred embodiment of the present invention, the first task is a timekeeping task and the second task is an application task. The present invention allows a user to interact with the application task while keeping time with the timekeeping task. This allows the user to track time spent for the purpose of billing clients for his time. When the user is not interacting with the timekeeping task, the application task is made automatically active without the user having to so designate manually. Accordingly, in this preferred embodiment, the functions associated with the first task include means for allowing the user to (1) establish a timer within the computer system, (2) display a corresponding timer indicator on the display device to let the user know the status of the timer and (3) set the timer to measure units of time for the user.

In a preferred embodiment, the user is allowed to establish the location and dimensions of the first window to ensure that the first window does not occlude an important portion of the second window. Therefore, the method, in this preferred embodiment, comprises the step of establishing the first portion.

In a preferred embodiment, the present invention allows the user to select what functions are to be displayed in the first window. These functions may be chosen from a configuration window to be described in more detail.

In a preferred embodiment, the first window contains a plurality of timer indicators arranged in a button bar. In this embodiment, the method of the present invention further comprises the step of stopping one of the plurality of timer indicators when another of the plurality of timer indicators is started. Thus, the user may record time spent on any one of a number of different matters by simply clicking the mouse or other pointing device on one of the timer indicators. The chosen timer indicator will then begin to measure time. The other timer indicators will cease to measure time.

In a preferred embodiment of the present invention, the various timer indicators can be labelled to indicate the matter for which they are measuring time. Accordingly, in this embodiment, the method further comprises the step of labeling the timer indicator.

Finally, in a preferred embodiment, the user can gain access to the complete functionality of the first application task by clicking on a button located in the first window. This gives the user quick access to the first application task. Accordingly, in this embodiment, the method further comprises the step of opening a further window by accessing one of the functions to allow the user to access further functions of the first task.

The foregoing has outlined rather broadly the features and technical advantages of the present invention so that the detailed description of the invention that follows may be better understood. Additional features and advantages of the invention will be described hereinafter which form the subject of the claims of the invention. Those skilled in the art should appreciate that the conception and the specific embodiment disclosed may be readily utilized as a basis for modifying or designing other structures for carrying out the same purposes of the present invention. Those skilled in the art should also realize that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 7 illustrates an active full screen window of a word processor application task and the timekeeping window of FIG. 6 occluding a portion of the word processing application task window;

DETAILED DESCRIPTION

Figure 1A:
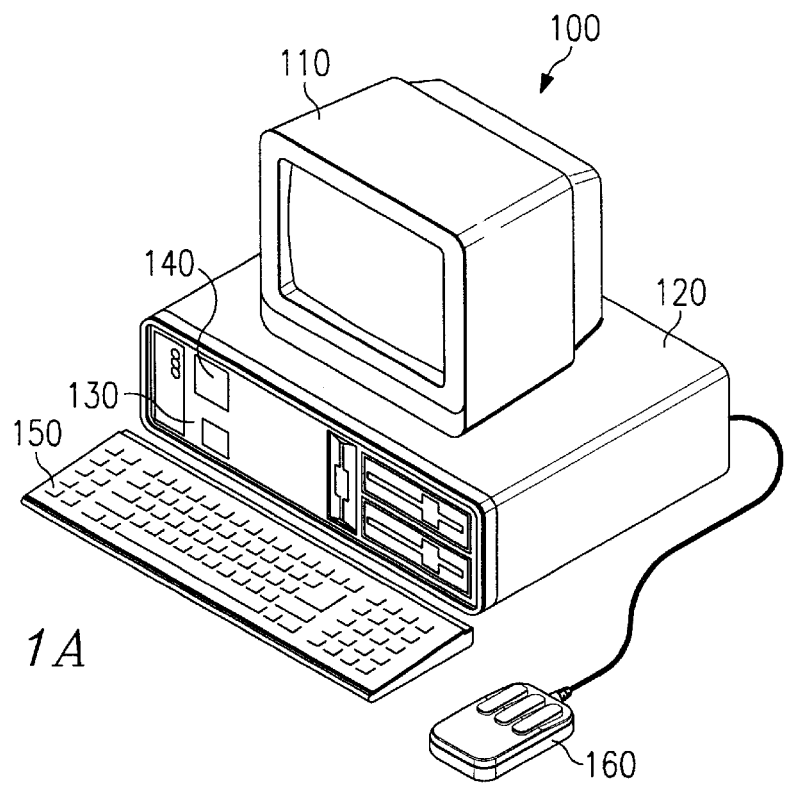
FIG. 1A illustrates a PC that provides an environment within which the present invention can operate.

Referring initially to FIG. 1A, illustrated is an isometric view of a PC 100 that provides an environment within which the present invention can operate. Since the present invention is not limited to application in a PC environment, however, FIG. 1A is illustrative only. The PC 100 includes a monitor or display device 110, a main chassis 120, within which are various electronic components of the PC 100 (shown in FIG. 1B) and a keyboard 150. Also shown is a mouse 160. The display device 110 and the keyboard 150 cooperate to allow communication between the PC 100 and a user. The main chassis 120 includes a dedicated hardware reset switch 130 adapted to trigger hardware reset circuitry (not shown in FIG. 1A) within the main chassis 120 to "reboot" or restart the PC 100 when the user depresses the reset switch 130. The main chassis 120 further includes a power switch 140 that is capable of interrupting power to the PC 100. Interruption and restoration of power also brings about a restart of the PC 100.

As previously described, the display device 110 provides an area for display of graphical data under the control of a GUI operating system executing in the PC 100. The GUI operating system manages division of computer resources among various user-selected application tasks executing on the PC 100, including division of the area of the display device 110 into windows for displaying data corresponding to each of the user-selected application tasks. Each of the windows is allowed to occupy a portion or an entirety of the area presented on the display device 110, depending on the user's wishes.

Figure 1B:
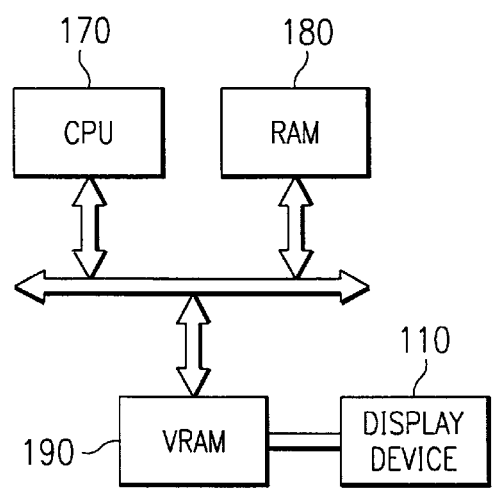
FIG. 1B illustrates a block diagram of components of the PC of FIG. 1A that provide an environment within which the present invention can operate.

Turning now to FIG. 1B, illustrated is a block diagram of components of the PC of FIG. 1A that provide an environment within which the present invention can operate. FIG. 1 shows a CPU 170 coupled to a memory device 180 and the display device 110 via VRAM 190. The memory device 180 is adapted for storing tasks for execution by the CPU 170. The CPU 180 accesses the VRAM 190 to display data on the display device 110. Those of ordinary skill in the art will understand the structure and function of the various components of FIGS. 1A and 1B.

FIGS. 2 through 9 will illustrate views of the area presented by the display device 110 of the PC 100 taken at various times to afford a more detailed understanding of the operation of the present invention. FIGS. 2 through 9 further show the present invention as implemented in a Microsoft® Windows® GUI environment. Those skilled in the art will recognize that the present invention is not limited to a particular manufacture of GUI environment.

Figure 2:
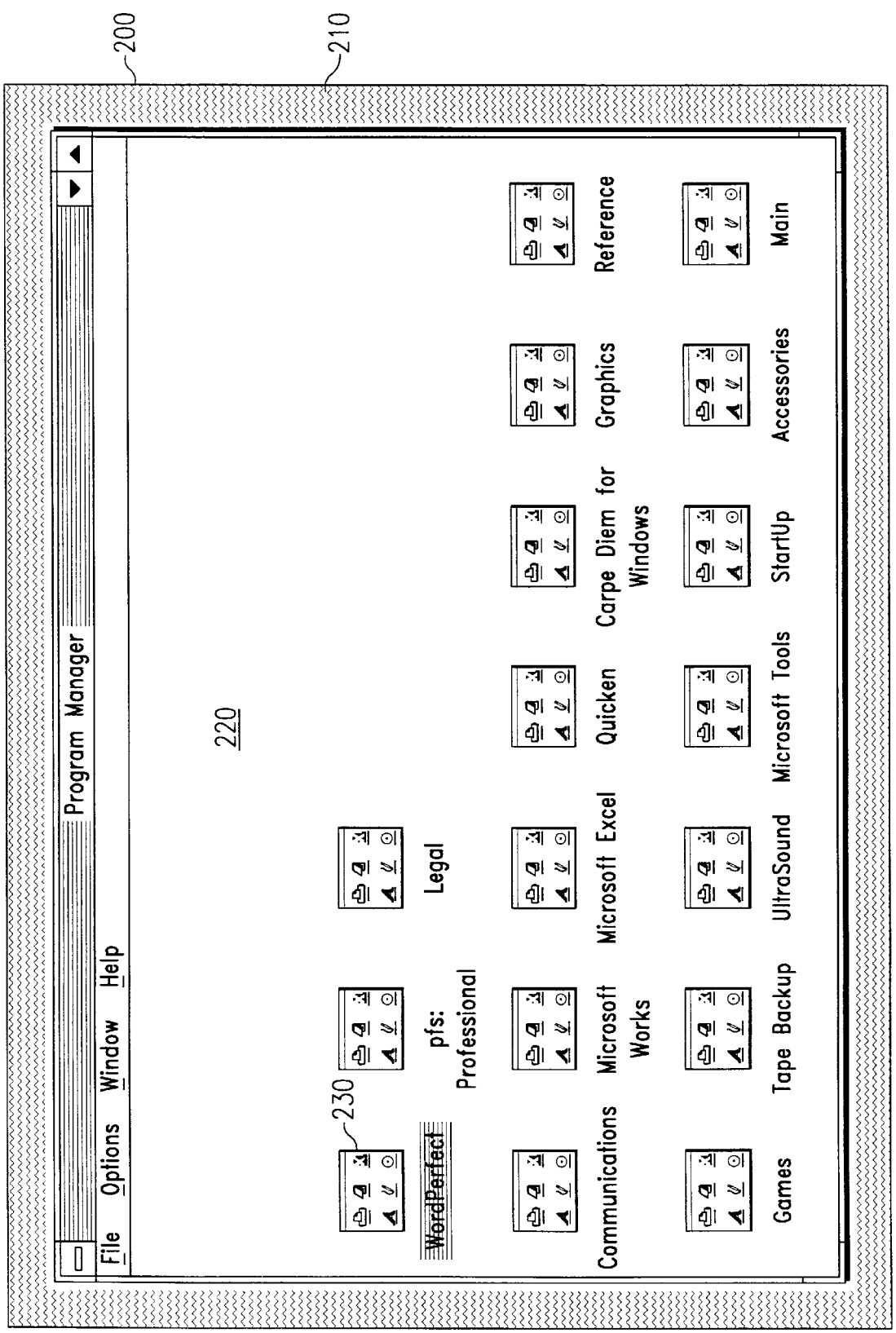
FIG. 2 illustrates a Windows® GUI environment including a program manager.

Turning now to FIG. 2, illustrated is a Windows® GUI environment as displayed on the display device 110 of FIG. 1A, including a program manager. The display device 110 presents an area 200 adapted to display a number of windows thereon. FIG. 2 shows a background or wallpaper 210 upon which is overlaid a single program manager window 220. The wallpaper 210 covers that portion of the area 200 not covered by the program manager window 220.

The program manager window 220 conventionally contains a plurality of program group icons 230 that, when double-clicked, open to reveal a window containing program item icons.

Figure 3:
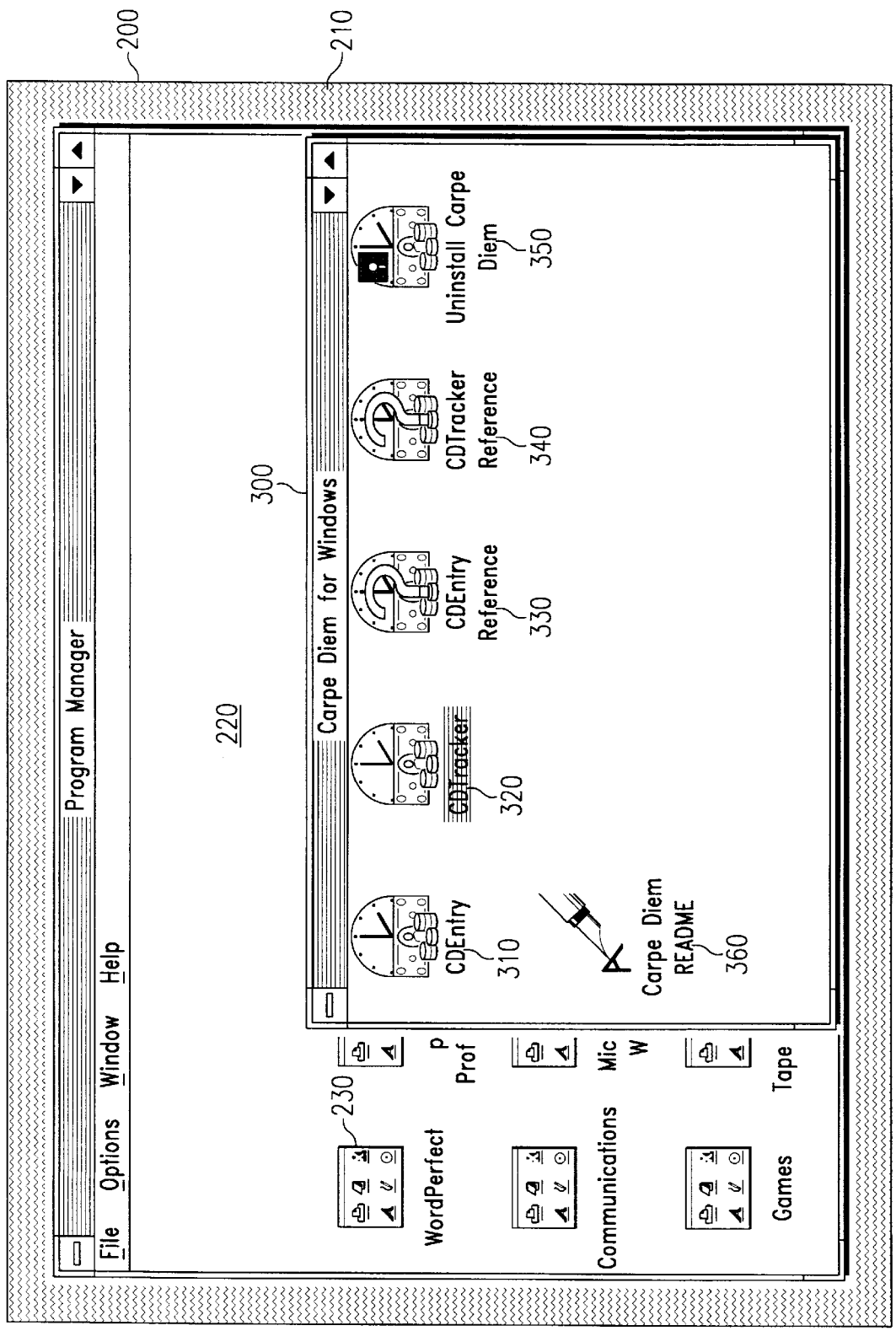
FIG. 3 illustrates a window within the program manager of FIG. 2 that includes icons representing an application task including the present invention.

Turning now to FIG. 3, illustrated is a program group window within the program manager window 220 of FIG. 2 that includes icons representing an application task including the present invention. The present invention is specifically described as being included in a program group window 300 entitled "Carpe Diem® for Windows" Within the program group window is a plurality of program item icons 310, 320, 330, 340, 350, 360. The present invention is contained in the program item icon 320 "CDTracker" which is shown highlighted.

Figure 4:
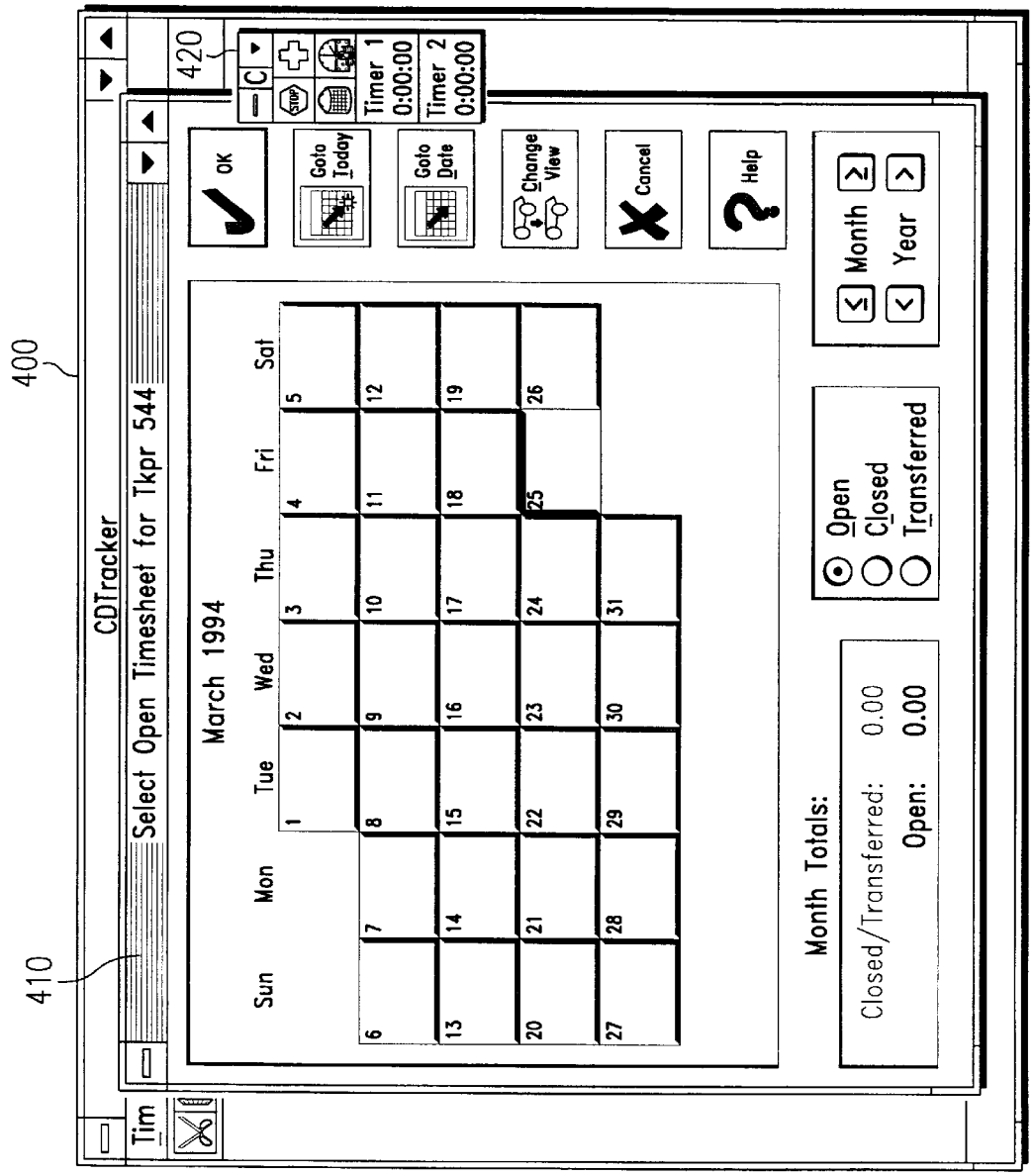
FIG. 4 illustrates an active full screen window of a CDTracker timekeeping application task, including a timekeeping calendar window and a timekeeping window including the present invention occluding a portion of the CDTracker timekeeping application task window.

Turning now to FIG. 4, illustrated is an active full screen window of a CDTracker timekeeping application task, including a timekeeping calendar window and a timekeeping window including the present invention occluding a portion of the CDTracker timekeeping application task window. The CDTracker timekeeping application task is executed by double-clicking on the CDTracker program item icon 320 of FIG. 3. In response, the PC 100 begins execution of the CDTracker application task displaying data corresponding thereto in a CDTracker timekeeping application task window 400. In the illustrated embodiment, the CDTracker timekeeping application task window 400 initially contains a timekeeping calendar window 410 and a timekeeping window 420. The timekeeping calendar window allows a user to designate a date for which to record professional time, among other functions. Once the user has designated a date for recording time, the user closes the timekeeping calendar window 410, leaving the CDTracker timekeeping application task window 400 and the timekeeping window 420 intact.

Figure 5:
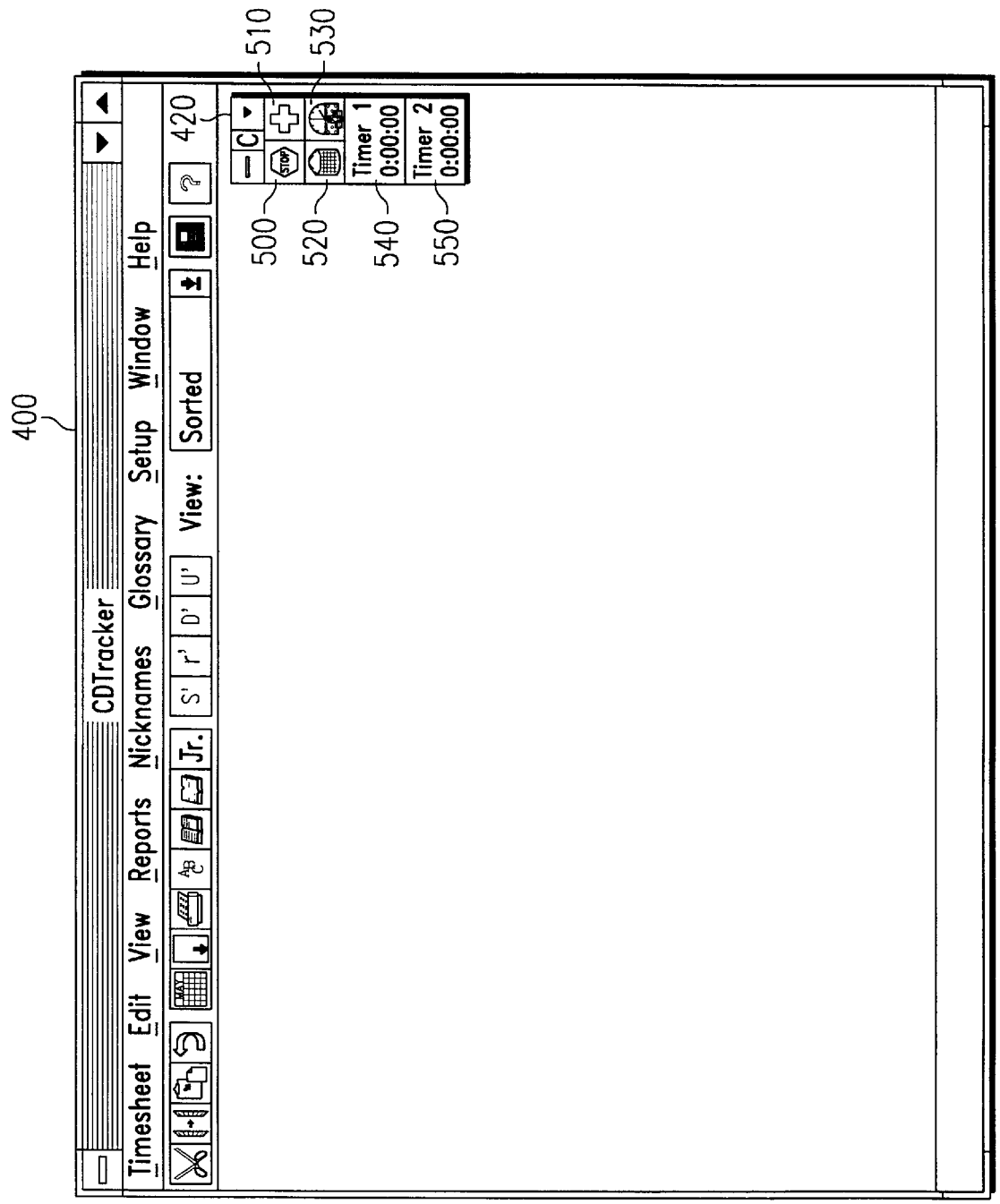
FIG. 5 illustrates the CDTracker timekeeping application task window and timekeeping window of FIG. 4 without the timekeeping calendar window of FIG. 4.

Turning now to FIG. 5, illustrated are the CDTracker timekeeping application task window 400 and timekeeping window 420 of FIG. 4 without the timekeeping calendar window of FIG. 4. The timekeeping window 420 contains the present invention and comprises a stop button 500, an add timer indicator button 510, a trashcan button 520, a CDTracker maximize button 530 and first and second timer indicator buttons 540, 550, arranged in a conventional button bar. In lieu of the stop button 500, a change orientation button may be supplied. The function of the change orientation button (not shown) is to toggle the orientation of the timekeeping window 420 between a vertical orientation (as shown) and a horizontal orientation, depending upon the user's preferences.

The stop button 500 allows the user to stop the timer indicators 540, 550 from counting time. If the stop button 500 is deleted and the change orientation button supplied in lieu thereof, the user can stop the timer indicators 540, 550 from counting time by clicking on the appropriate indicator. This allows the user to go "off the clock" to perform duties for which the user has no need to keep time. The add timer indicator button 510 allows the user to add or establish as many timer indicators as necessary. For example, FIG. 5 shows two timer indicators 540, 550. If the user is interested in keeping time with respect to three matters, the user can establish a third timer indicator to the two already in place. In the illustrated embodiment, a third timer indicator can be established by clicking on the add timer indicator button 510.

The trashcan button 520 allows a user to delete a timer indicator and to dispose of the time recorded thereby. In the illustrated embodiment, the user can delete a timer indicator by clicking and dragging a particular timer indicator to the trashcan button 520. This will be illustrated in more detail to follow. The CDTracker maximize button 530 allows the user to call the CDTracker timekeeping application task window 400 to the foreground (maximizing the window therefor) to allow the user to access the full functionality of the CDTracker application task when desired. It should be understood, however, that the CDTracker timekeeping application task always controls the timekeeping window 420, even when minimized.

The first and second timer indicator buttons 540, 550 allow the user to count time with respect to two matters. For instance, the first timer indicator 540 may correspond to a family law matter for Client A and the second timer indicator 550 may correspond to a corporate law matter for Client B. When the user, who is assumed at this point to be an attorney, clicks on the first timer indicator 540, the first timer indicator 540 will begin to count time, preferably measured and displayed in hours, minutes and seconds. The user can then begin to work on the family law matter. If the user then begins work on the corporate law matter, the user need only click on the second timer indicator 550. The first timer indicator 540 will cease to count time and the second timer indicator 550 will start to count time. If the user needs to take a break, the user need only click on the stop button 500 (or click again on the second timer indicator 550, if the change orientation button has been substituted for the stop button 500 as previously described), and the second timer indicator 550 will cease to count time. If the user needs to add another timer indicator to count time pertaining to, say, a criminal law matter, the user need only click on the add timer indicator button 510, and a third timer indicator will be established.

The CDTracker timekeeping application task allows the user to configure the timekeeping window 420 to fit the needs of the user. For instance, the user can configure the timekeeping window 420 to be oriented vertically or horizontally (as previously described, a change orientation button can alternatively be included in the timekeeping window 420). The user can program whether the timekeeping window 420 is initially displayed, minimized or hidden. The user can set the width of the timekeeping window 420 as either narrow, medium or wide. This, along with the conventional ability of the user to determine placement of the timekeeping window on the area 200, determines the region that the timekeeping window is to occupy. The user can set the initial number of timer indicators 540, 550. The user can also enter titles or labels for each timer indicator 540, 550, allowing the user to refer to the timer indicators 540, 550 by a corresponding matter type or number. Finally, and germane to the present invention, the user can determine whether the timekeeping window 420 is to remain in the foreground, no matter what other windows may be currently active.

Figure 6:
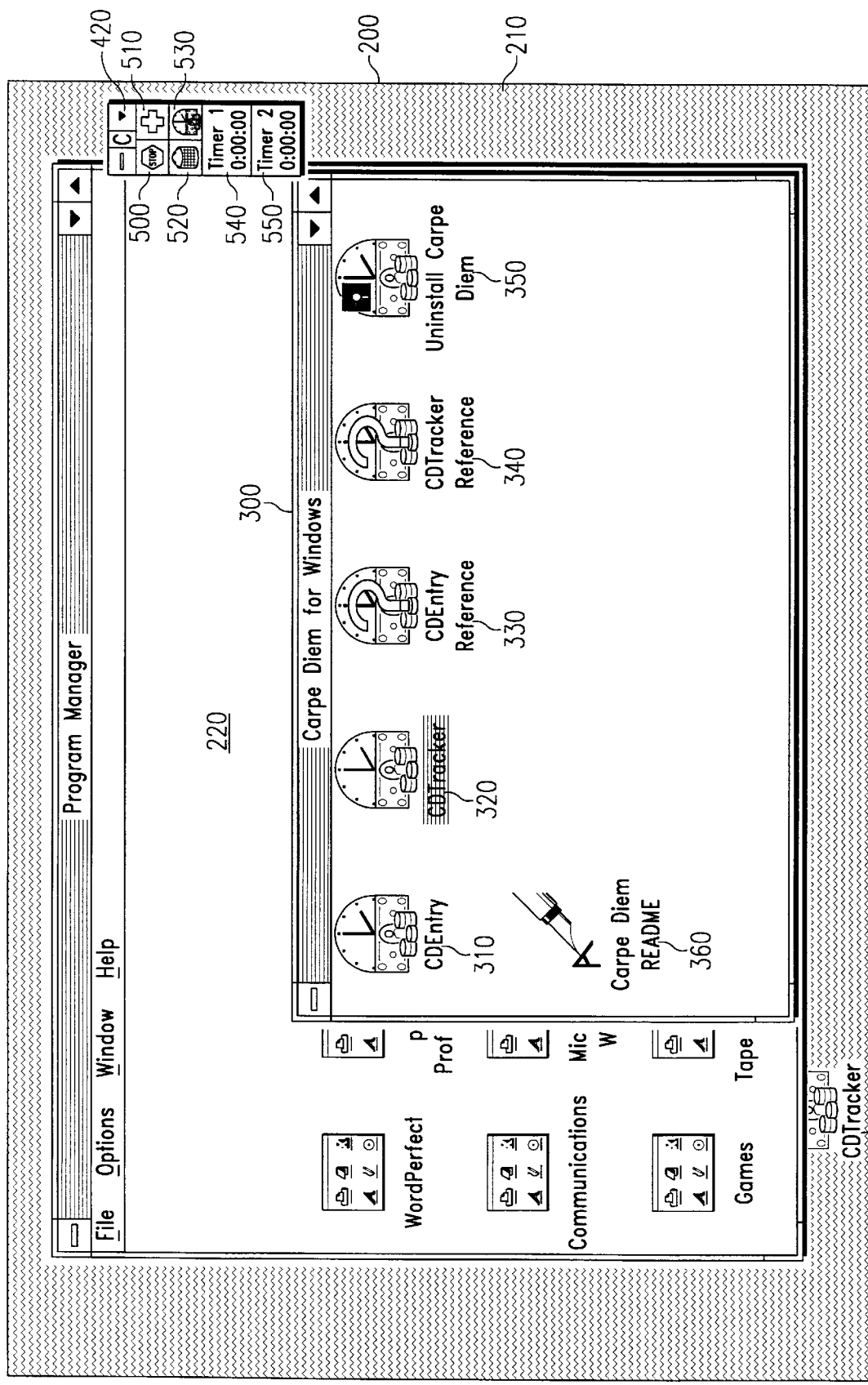
FIG. 6 illustrates the program manager and Carpe Diem for Windows program group window of FIG. 3 with the timekeeping window of FIG. 5 occluding a portion of each and the CDTracker timekeeping application task window of FIG. 5 minimized.

Turning now to FIG. 6, illustrated is the program manager and Carpe Diem for Windows program group window 300 of FIG. 3 with the timekeeping window 420 of FIG. 5 occluding a portion of each and the CDTracker timekeeping application task window 400 of FIG. 5 minimized. At this point, the user has configured the timekeeping window 420 as desired and has minimized the CDTracker timekeeping application task window 400 in a conventional manner. It should be noted that the timekeeping window 420 remains in place even though the CDTracker timekeeping application task window 400 has been minimized. This is an important feature of the present invention.

Turning now to FIG. 7, illustrated is an active full screen window of a word processor application task and the timekeeping window of FIG. 6 occluding a portion of the word processing application task window. In this case, the user has initiated execution of WordPerfect® for Windows®, a popular word processor application task. In response to the user's initiation of WordPerfect®, the GUI operating system of the PC 100 has created a WordPerfect® window 700 to contain data corresponding to the WordPerfect® application task. The user has further begun to work on a document, presumably pertaining to a third matter, as the user has added a third timer indicator 710 to the timekeeping window 420. It is important to note that the timekeeping window 420 continues to occlude a portion of the WordPerfect® window 700. The timekeeping window 420 will occlude any other windows placed on the area 200 to the extent that the region of the timekeeping window 420 overlaps any region of any other window. The same holds true for MS-DOS® application tasks executing in a window. However, due to the peculiar manner in which full screen MS-DOS® applications are handled, the timekeeping window 420 cannot occlude MS-DOS® application tasks executing full-screen.

It is important to note that the user can access a function in the timekeeping window 420 at any time. When the user temporarily accesses a function in the timekeeping window 420, the timekeeping window 420 becomes active only for the brief period of time that it takes to perform the function. For instance, if the user initiates a timer indicator, the timekeeping window 420 goes active for only the split second required to initiate the indicator and automatically redesignates the WordPerfect® window 700 as the active, foreground window. Thus, the user does not need manually to redesignate the WordPerfect® window 700 as the active window by clicking in the WordPerfect® window 700, as in the prior art. This represents a significant advantage in convenience to the user over the prior art. If the user's computer system is sufficiently fast, the WordPerfect® window 700 appears to remain active continuously throughout the accessing of the timekeeping function, as the timekeeping window 420 performs its function and redesignates the WordPerfect® window 700 as the active window in a very short time.

Figure 8:
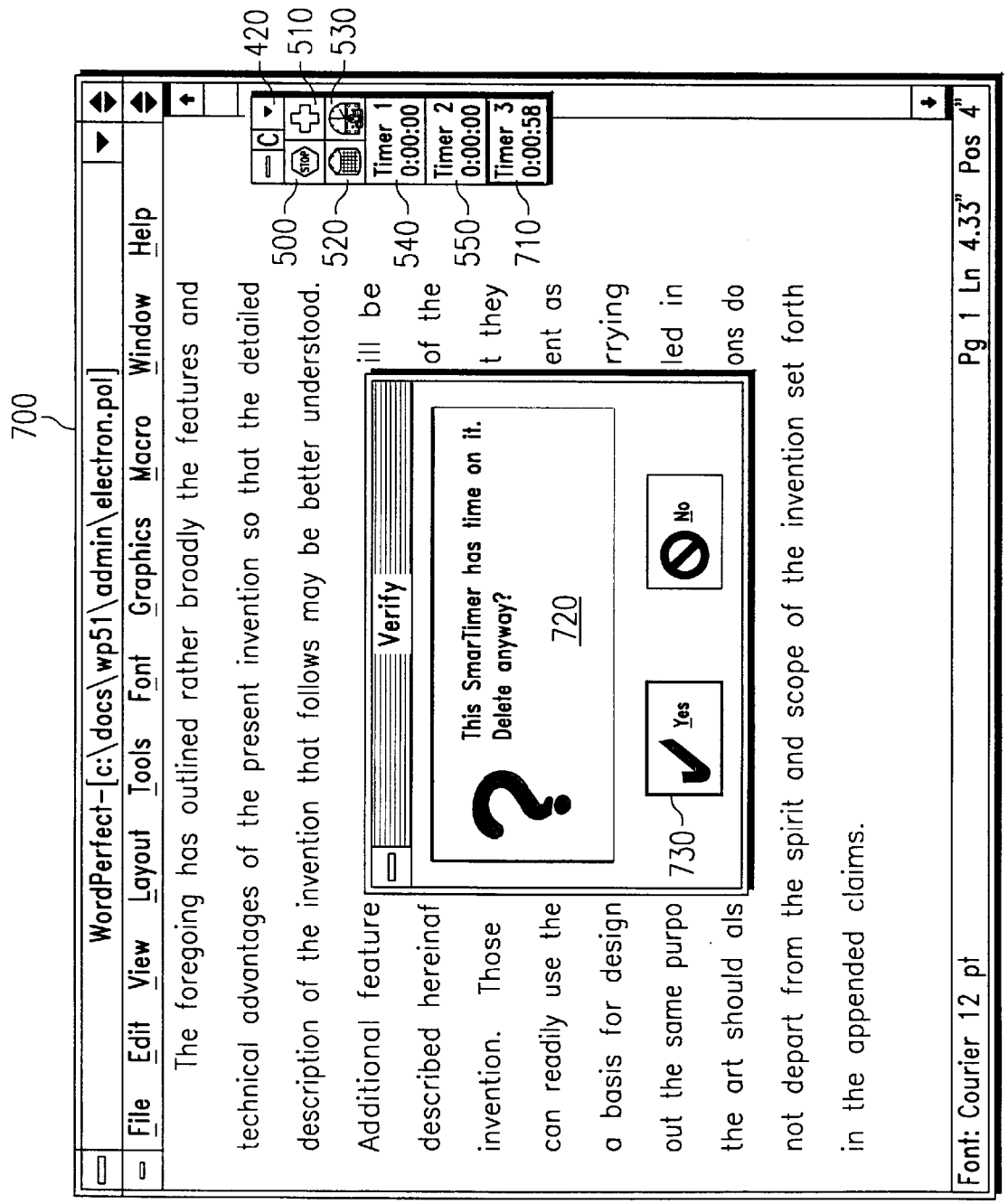
FIG. 8 illustrates a function of the timekeeping window of FIG. 7 wherein a timer indicator may be deleted.
Figure 9:
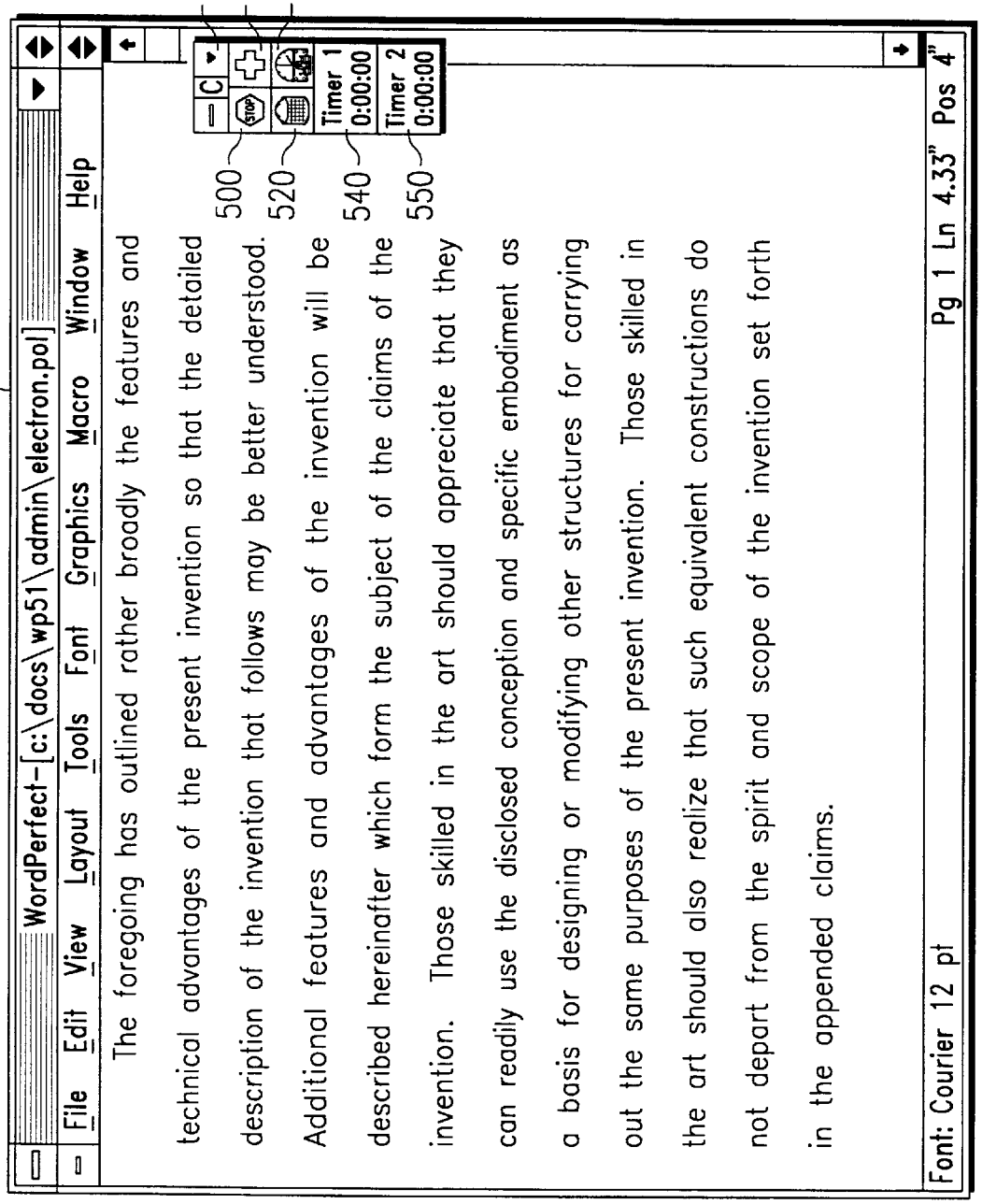
FIG. 9 illustrates the timekeeping window of FIG. 8 after the timer indicator has been deleted.

Turning now to FIG. 8, illustrated is a function of the timekeeping window of FIG. 7 wherein a timer indicator may be deleted. The user desires to delete the third timer indicator 710 and the time recorded thereby. Presumably, the user does not wish to retain a record of time spent on the criminal law matter. By clicking on the third timer indicator 710, dragging the third timer indicator 710 to the trashcan button 520 and releasing the button on the mouse 160, the user can delete the third timer indicator 710. If the third timer indicator 710 has time on it, the timekeeping application task directs the GUI operating system to create a verify window 720 within which the timekeeping application task queries the user as to whether deletion of the third timer indicator is really desired. If the user answers in the affirmative (by clicking on a yes button 730), the timekeeping application task responds by deleting the third timer indicator 710. FIG. 9 illustrates the timekeeping window of FIG. 8 after the third timer indicator 710 has been deleted. Again, the WordPerfect® window 700 is automatically redesignated as the active window, without user intervention.

Figure 10:
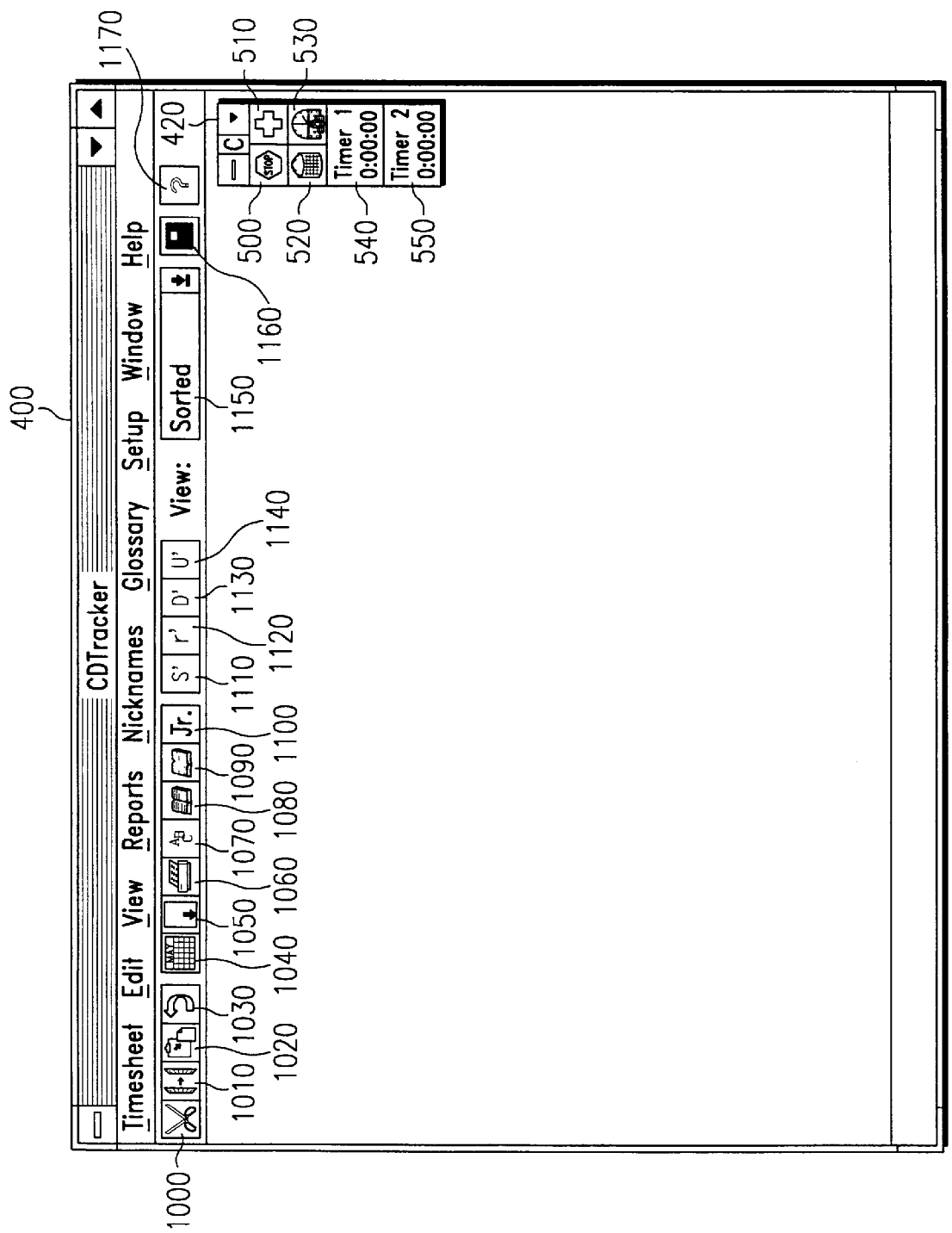
FIG. 10 illustrates the active CDTracker timekeeping application task window accessible via the timekeeping window of FIG. 9.

Turning now to FIG. 10, illustrated is the active CDTracker timekeeping application task window accessible via the timekeeping window of FIG. 9. If the user desires to access the full functionality of the CDTracker application task, the user need only click on the CDTracker maximize button 530. In response, the GUI operating system maximizes the CDTracker timekeeping application task window 400 to fill the area 200 entirely, except for that region occupied by the timekeeping window 420, which continues to occlude all else.

Among other things, the CDTracker timekeeping application task window allows access to functions of the CDTracker application task including moving of text from Carpe Diem to the clipboard (button 1000), copying of text from Carpe Diem to the clipboard (button 1010), pasting of text from the clipboard into Carpe Diem (button 1020), reversing a previous text modification (button 1030), selecting a timesheet from the calendar for editing (button 1040), transferring timesheets to an accounting system (button 1050), printing timesheets (button 1060), checking spelling (button 1070), modifying a personal glossary (button 1080), selecting entries from a system glossary (button 1090), modifying nicknames (button 1100), displaying a production report (button 1110), displaying a chronological log of work performed during a given day (button 1120), displaying a client/matte report (button 1130), creating a custom report (button 1140), choosing a desired data view (button 1150), exiting CDTracker (button 1160) and accessing help (button 1170).

From the above, it is apparent that the present invention provides a method of displaying graphical data on a display device of a computer system and a computer system employing the method. The method comprises the steps of: (1) forming a first window on the display device, the first window capable of displaying data associated with a first task executing on the computer system, the first window occluding a first portion of a total area of the display device, the first window being a currently active window and (2) forming a second window on the display device, the second window capable of displaying data associated with a second task executing on the computer system, the second window occluding a second portion of the total area of the display device and superseding the first window as the currently active window, the first window occluding the second window to an extent that the first portion overlaps the second portion, the first window continuing to present functions associated with the first task to the user while the user interacts with the second task, the first task automatically redesignating the second window as the currently active window when the user is not interacting with the first task.

Although the present invention and its advantages have been described in detail, it should be understood that various changes, substitutions and alterations can be made herein without departing from the spirit and scope of the invention as defined by the appended claims.

What is claimed is:

1. A system for keeping time, comprising:
   a memory device for storing application tasks for execution by said computer system;
   a central processing unit (CPU) coupled to said memory device for executing selectable ones of said application tasks;
   a display device coupled to said CPU and providing an area for displaying data associated with said selectable ones of said application tasks, said area capable of being divided into a plurality of windows, said plurality of windows providing regions within said area for displaying data associated with corresponding said selectable ones of said application tasks, said plurality of windows capable of occluding one another to denote foreground and background tasks on said computer system; and
   a timekeeping task storable on said memory device and executable by said CPU as a background task, said timekeeping task capable of forming an associated timekeeping window in a foreground on said display device that:
      is capable of occluding a portion of said plurality of windows, including a portion of a window corresponding to a foreground application task, and
      allows a user continued access to a timekeeping function of said timekeeping task that is operating as said background task, said continued access allowed without requiring said timekeeping task to be made a foreground task.

2. The timekeeping system as recited in claim 1 wherein said timekeeping task operating as said background task counts time and said associated timekeeping window in said foreground allows continued access to a timer indicator that displays said counted time.

3. The timekeeping system as recited in claim 2 wherein said timekeeping task operating as said background task counts time with respect to a matter.

4. The timekeeping system as recited in claim 3 wherein said timekeeping task operating as a background task always controls said associated timekeeping window.

5. The timekeeping system as recited in claim 1 wherein said associated timekeeping window in said foreground allows said user to select said function of said timekeeping task operating as said background task.

6. The timekeeping system as recited in claim 1 wherein said associated timekeeping window allows continued access to said timekeeping function to allow said user to set a timer.

7. The timekeeping system as recited in claim 1 wherein said associated timekeeping window allows continued access to a timer indicator that is capable of measuring units of time.

8. The system as recited in claim 1 wherein said timekeeping function is a timer and said associated timekeeping window allows continued access to allow said user to establish a timer.

9. The timekeeping system as recited in claim 1 wherein said timekeeping task operating as said background task allows said user to establish said region of said associated timekeeping window.

10. The timekeeping system as recited in claim 1 wherein said timekeeping task operating as said background task allows said user to select said function to be displayed in said associated timekeeping window.

11. The timekeeping system as recited in claim 1 wherein said associated timekeeping window contains a plurality of timer indicators arranged in a button bar.

12. The timekeeping system as recited in claim 1 wherein said associated timekeeping window contains a plurality of timer indicators, said timekeeping system stopping one of said plurality of timer indicators when another of said plurality of timer indicators is started.

13. The timekeeping system as recited in claim 11 wherein said associated timekeeping window contains a timer indicator, said timekeeping task operating as said background task capable of allowing said user to label said timer indicator.

14. A method of operating a timekeeping system to display graphical data on a display device of said timekeeping system, comprising the steps of:
   forming a first window on said display device, said first window capable of displaying data associated with a timekeeping task executing as a foreground task on said timekeeping system, said first window occluding a first portion of a total area of said display device, said first window being a currently active window; and
   making said timekeeping task a background task on said timekeeping system when a second window is formed on said display device, said second window capable of displaying data associated with an application task executing on said timekeeping system, said second window capable of occluding a second portion of said total area of said display device and superseding said first window as said currently active window, said first window occluding said second window to an extent that said first portion overlaps said second portion, said first window continuing to present a timekeeping function associated with said timekeeping task to said user while said user interacts with said application task to allow said user continued access to said timekeeping function of said timekeeping task, still operating as said background task, without requiring said timekeeping task to be redesignated as said foreground task.

15. The method of operation as recited in claim 14 wherein said timekeeping task operating as said background task counts time and said method of operation further comprises the step of allowing continued access to a timer indicator that displays said counted time in said associated timekeeping window.

16. The method of operation as recited in claim 15 further comprising the step of counting time with respect to a matter.

17. The method of operation as recited in claim 16 wherein said timekeeping task operating as a background task always controls said associated timekeeping window.

18. The method of operation as recited in claim 14 further comprising the step of allowing said user to select said timekeeping function of said timekeeping task operating as said background task.

19. The method of operation as recited in claim 14 further comprising the step of allowing continued access to said timekeeping function to allow said user to set a timer.

20. The method of operation as recited in claim 14 further comprising the step of allowing continued access to a timer indicator of said associated timekeeping window, said timer indicator capable of measuring units of time.

21. The method of operation as recited in claim 14 wherein said timekeeping function is a timer and said method of operation further comprises the step of allowing continued access to said associated timekeeping window to allow said user to establish a timer.

22. The method of operation as recited in claim 14 further comprising the step of allowing said user to establish said region of said associated timekeeping window.

23. The method of operation as recited in claim 14 further comprising the step of allowing said user to select said timekeeping function to be displayed in said associated timekeeping window.

24. The method of operation as recited in claim 14 wherein said associated timekeeping window contains a plurality of timer indicators arranged in a button bar.

25. The method of operation as recited in claim 14 wherein said associated timekeeping window contains a plurality of timer indicators, said method of operation further comprising the step of stopping one of said plurality of timer indicators when another of said plurality of timer indicators is started.

26. The method of operation as recited in claim 14 wherein said associated timekeeping window contains a timer indicator, and said method of operation further comprising the step of allowing said user to label said timer indicator.

27. The method of operation as recited in claim 14 wherein said method of operation is embodied in a plurality of tasks executable by a computer system.

\* \* \* \* \*

UNITED STATES PATENT AND TRADEMARK OFFICE
CERTIFICATE OF CORRECTION

PATENT NO. : 5,812,132
DATED : September 22, 1998
INVENTOR(S) : Goldstein

It is certified that error appears in the above-indentified patent and that said Letters Patent is hereby corrected as shown below:

Col.5, line 61 (Specification page 14, line 12) "Windows"" should be -- Windows."--; and Col. 9, line 4 (Specification page 21, line 16) "matte" should be -- matter--.

Signed and Sealed this

Fifteenth Day of December, 1998

*Attest:*

BRUCE LEHMAN

*Attesting Officer*     *Commissioner of Patents and Trademarks*